United States Patent [19]

Grieco et al.

[11] Patent Number: 5,758,099
[45] Date of Patent: May 26, 1998

[54] PLUG AND PLAY PROTOCOL FOR BUS ADAPTER CARD

[75] Inventors: Frank Edward Grieco, Apex; Peter A. Manson, Cary, both of N.C.

[73] Assignee: International Business Machines Corporation, Armonk, N.Y.

[21] Appl. No.: 657,480

[22] Filed: May 29, 1996

[51] Int. Cl.[6] ..................................................... H01J 13/00
[52] U.S. Cl. ........................... 395/282; 395/281; 395/285; 395/822
[58] Field of Search ........................ 395/281, 282, 395/283, 285, 309, 311, 822, 831, 834, 882, 883, 885, 892, 800, 527, 828, 830, 500, 651, 652

[56] References Cited

U.S. PATENT DOCUMENTS

| | | | |
|---|---|---|---|
| 5,191,653 | 3/1993 | Banks et al. | 395/821 |
| 5,239,632 | 8/1993 | Larner | 395/311 |
| 5,420,412 | 5/1995 | Kowalski | 235/492 |
| 5,517,646 | 5/1996 | Piccirillo et al. | 395/700 |
| 5,535,342 | 7/1996 | Taylor | 395/307 |
| 5,559,965 | 9/1996 | Oztaskin et al. | 395/284 |
| 5,590,313 | 12/1996 | Reynolds et al. | 395/500 |
| 5,630,174 | 5/1997 | Stone, III et al. | 395/883 |
| 5,634,075 | 5/1997 | Smith et al. | 395/829 |
| 5,640,594 | 6/1997 | Gibson et al. | 395/829 |
| 5,655,148 | 8/1997 | Richman et al. | 395/828 |
| 5,689,726 | 11/1997 | Lin | 395/830 |

*Primary Examiner*—Jack B. Harvey
*Assistant Examiner*—Raymond N. Phan
*Attorney, Agent, or Firm*—Steven B. Phillips; Thomas F. Galvin

[57] ABSTRACT

A system and method of partitioning and providing communication to allow ISA Plug and Play protocol logic functions to be shared across multiple integrated circuits on a single Plug and Play compliant ISA bus adapter card as defined by the Plug and Play ISA Specification in a manner that minimizes the duplication of function.

11 Claims, 5 Drawing Sheets

PLUG AND PLAY PROTOCOL FOR BUS ADAPTER CARD

TECHNICAL FIELD

The present invention relates in general to data processing systems, and in particular, to Plug and Play protocol for use with bus adapter cards coupled to a data processing system.

BACKGROUND INFORMATION

The ISA (Industry Standard Architecture) bus is the most popular expansion standard in the PC (personal computer) industry. The ISA bus architecture requires the allocation of memory and I/O (input/output) address spaces, DMA (Direct Memory Access) channels, and interrupt levels among multiple ISA adapter cards (also referred to herein as "peripheral cards"). Previously, the ISA interface had no defined hardware or software mechanism for allocating these resources. As a result, configuration of ISA cards was typically done with "jumpers" that change the decode maps for memory and I/O space and steer the DMA and interrupt signals to different pins on the bus. Users typically resolved sharing conflicts by referring to documentation provided by each card manufacturer. For the average user, this configuration process was unreliable and frustrating.

The ISA Plug and Play protocol, as defined within "PLUG AND PLAY ISA SPECIFICATION," Version 1.0a, May 5, 1994, copyright Intel and Microsoft Corporation (which is hereby incorporated by reference herein) (also referred to herein as the "Specification" or the "Plug and Play Specification"), allows ISA bus adapter cards containing the requisite logic circuits as defined by the Specification to be automatically recognized and configured by an ISA host system running ISA Plug and Play protocol software. The ISA Plug and Play protocol software may be Plug and Play device identification, isolation, and configuration code incorporated into the system BIOS firmware, or maybe in a device driver incorporated in or operating in conjunction with the operating system, or a combination of both, per the various specifications published by the Plug and Play Association.

The Plug and Play Specification defines mechanisms that each Plug and Play ISA card implement to support identification, resource usage determination, conflict detection, and conflict resolution.

The logic for the Plug and Play protocol is typically contained in one integrated circuit logic module ("IC" or "chip") on the peripheral card. Difficulties arise due to the fact that often the Plug and Play logic implementation in the IC is specific to the main function of the IC. If an adapter card designer wishes to add other functions to the card that employ the IC to implement Plug and Play functions (as well as the primary function of the IC), and the designer wishes to extend Plug and Play configuration capability as defined and required by the Plug and Play Specification to the other functions, the designer must duplicate the Plug and Play logic in other ICs on the card. This approach is unfeasible as it creates a plurality of cards as defined by the Specification where the Plug and Play protocol should detect only one card. It also adds complexity and expense to the other functions on the card, which must each support logic circuits to implement the entire Plug and Play protocol.

Therefore, what is needed in the art is a solution that allows one or more additional functions in separate integrated circuits to share Plug and Play protocol logic and resource data with the main function on another integrated circuit and thereby minimize the duplication of logic circuits.

SUMMARY OF THE INVENTION

The foregoing need is satisfied by the present invention, which provides circuitry for extending Plug and Play configuration to one or more logical devices not associated with a main integrated circuit on an ISA Plug and Play adapter card. Thus, a provision is made to signal one or more slave integrated circuits on an ISA Plug and Play adapter card if ISA Plug and Play host software is attempting to address a logical device not associated with the main integrated circuit.

Additionally, slave integrated circuits mounted on the ISA Plug and Play adapter card also have an ability to extend Plug and Play configuration to "downstream" integrated circuits.

One advantage of the present invention is that it allows an adapter card designer to provide a capability for the adapter card to be expanded at a later time by the addition of one or more additional integrated circuits. Thus, additional logical devices can be added to the adapter card without having to redesign the main integrated circuit.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
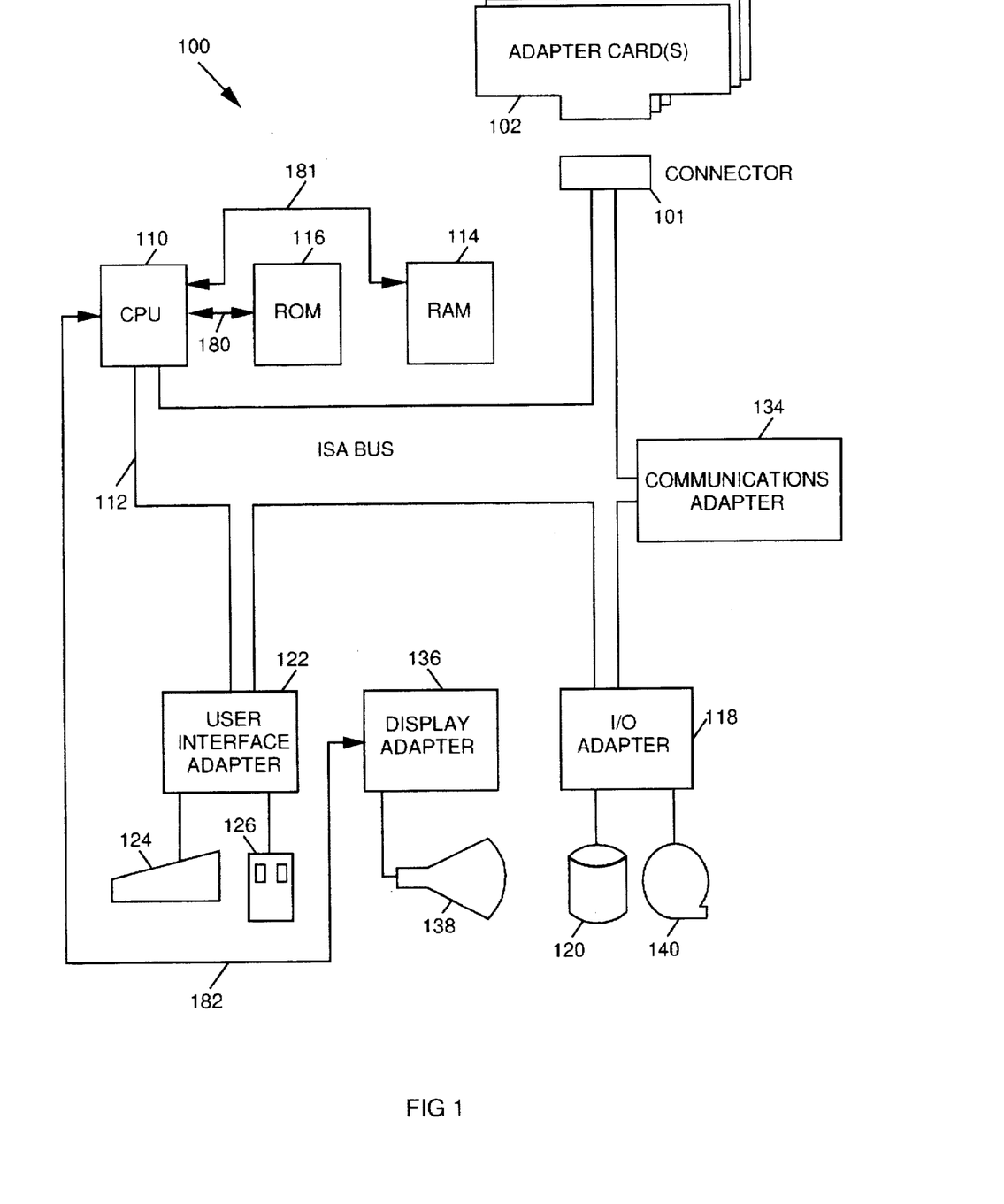
FIG. 1 illustrates a data processing system configured in accordance with the present invention.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via ISA bus 112. System 100 shown in FIG. 1 includes random access memory (RAM) 114 coupled by bus 181 to CPU 110, read only memory (ROM) 116 coupled by bus 180 to CPU 110, and display adapter 136, coupled by bus 182 to CPU 110, for connecting to display device 138. System 100 also includes input/output (I/O) adapter 118 for connecting peripheral devices such as disk units 120 and tape drives 140 to ISA bus 112, user interface adapter 122 for connecting keyboard 124, mouse 126, and/or other user interface devices such as a touch screen device (not shown) to ISA bus 112, and communication adapter 134 for connecting system 100 to a data processing network (not shown). CPU 110 may include other circuitry not shown herein, which will include circuitry commonly found within a microprocessor, e.g., execution unit, bus interface unit, arithmetic logic unit, etc. CPU 110 may also reside on a single integrated circuit.

System 100 is shown and described to provide an example of a data processing system that is configurable in accordance with the present invention. However, this in no way limits application of the present invention to any specific configuration of data processing system components.

System 100 is also configurable for expansion through the use of one or more adapter cards 102, which may be coupled to connector 101 coupled to ISA bus 112. Adapter cards 102 will contain the present invention as discussed below with respect to FIGS. 2–4.

Figure 5:
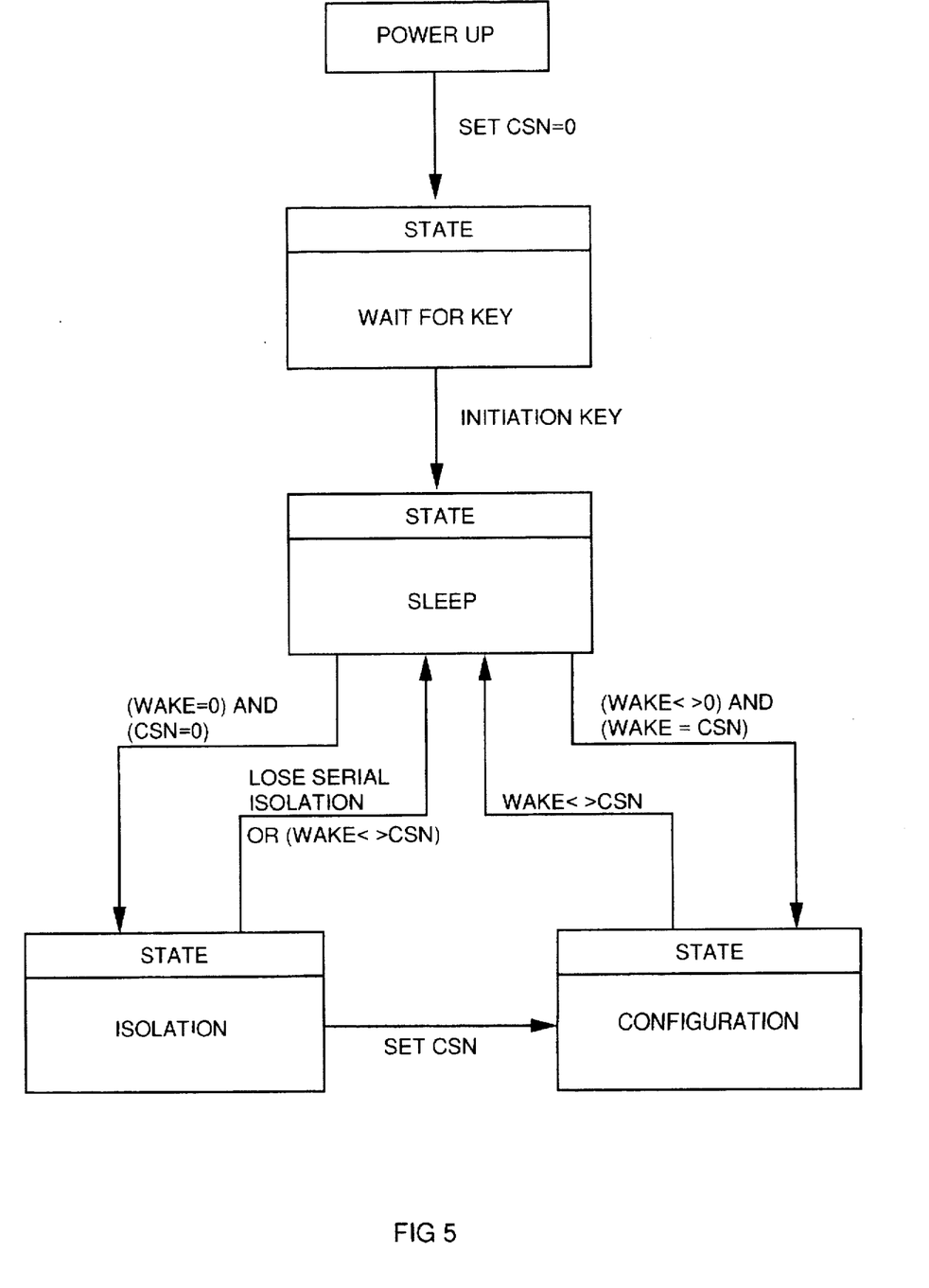
FIG. 5 illustrates Plug and Play ISA Card State Transitions.

Referring next to FIG. 5, there is illustrated state transitions of a Plug and Play ISA card, such as cards 102, as similarly depicted on page 18 of the referenced Specification. As set forth in the Plug and Play ISA Specification, on power up of system 100, all Plug and Play cards 102 go through a procedure and enter a "Wait for Key" state. Cards in the "Wait for Key" state do not respond to any access to their auto-configuration ports until an Initiation Key is detected. When cards 102 have received the Initiation Key, they enter the "Sleep" state. In this "Sleep" state, cards 102 listen for a Wake[CSN] command (CSN=Card Select Number). This Wake[CSN] command will send all cards 102 to the "Isolation" state.

Thereafter, the host software within computer system 100 commences a series of read operations, which result in an isolation of one of one or more cards 102. The isolated card 102 remains in the "Isolation" State while all other cards 102 have failed the isolation protocol and have returned to the "Sleep" state. The CSN on this isolated card 102 is then set to a unique number. Writing this value by the host software causes this card 102 to transition to the "Configuration," or "Config," state. Sending a Wake[0] command causes this card 102 to transition back to the "Sleep" state. This entire process is repeated until no Plug and Play cards 102 are detected.

Within the "Configuration" state, the requirements for resources by the particular card 102 in the "Configuration" state are read by the host software, which subsequently programs card 102 with the required resource parameters.

A logical device per the ISA Plug and Play Specification is a particular function. An ISA Plug and Play adapter card can have multiple functions, and hence multiple logical devices. Plug and Play configuration registers are defined to allow the assignment of ISA system resources to each logical device.

Plug and Play cards 102 support configuration registers which are used to configure the card's ISA resource usage per logical device, setting the use of resources such as:

Memory Address Base registers
I/O Address Base registers
Interrupt Level Select registers
DMA Channel Select These registers (not shown) are read/write and always reflect the current operation of all logical devices on the Plug and Play card 102. If a resource is not programmable, then the configuration register bits are read-only.

Resource data is read from each Plug and Play card 102 that describes how many logical devices are on card 102 as well as the resource requirements for each logical device. Any of the configuration registers that are programmable must be programmed into the logical device through the card's Plug and Play register interface.

A logical device's configuration registers are programmed by first writing the logical device number to the Logical Device Number register. The logical device number is determined by the order in which logical devices are read from the card's resource data.

After a logical device is selected, configuration registers are programmed by writing the proper values to the Plug and Play register interface.

A Plug and Play card 102 is programmed by sending card 102 a Wake[CSN] command with the right data set to the card's CSN. This will force the one card 102 with the matching CSN into the "Configuration" state and force all other cards into the "Sleep" state. Next, the logical device to be programmed on card 102 is selected by writing the logical device number to the Logical Device Number register. If card 102 has only one logical device, this step may be skipped.

All of the above is described in more detail within the Plug and Play ISA Specification, Version 1.0a, referenced above and hereby incorporated by reference herein.

Figure 2:
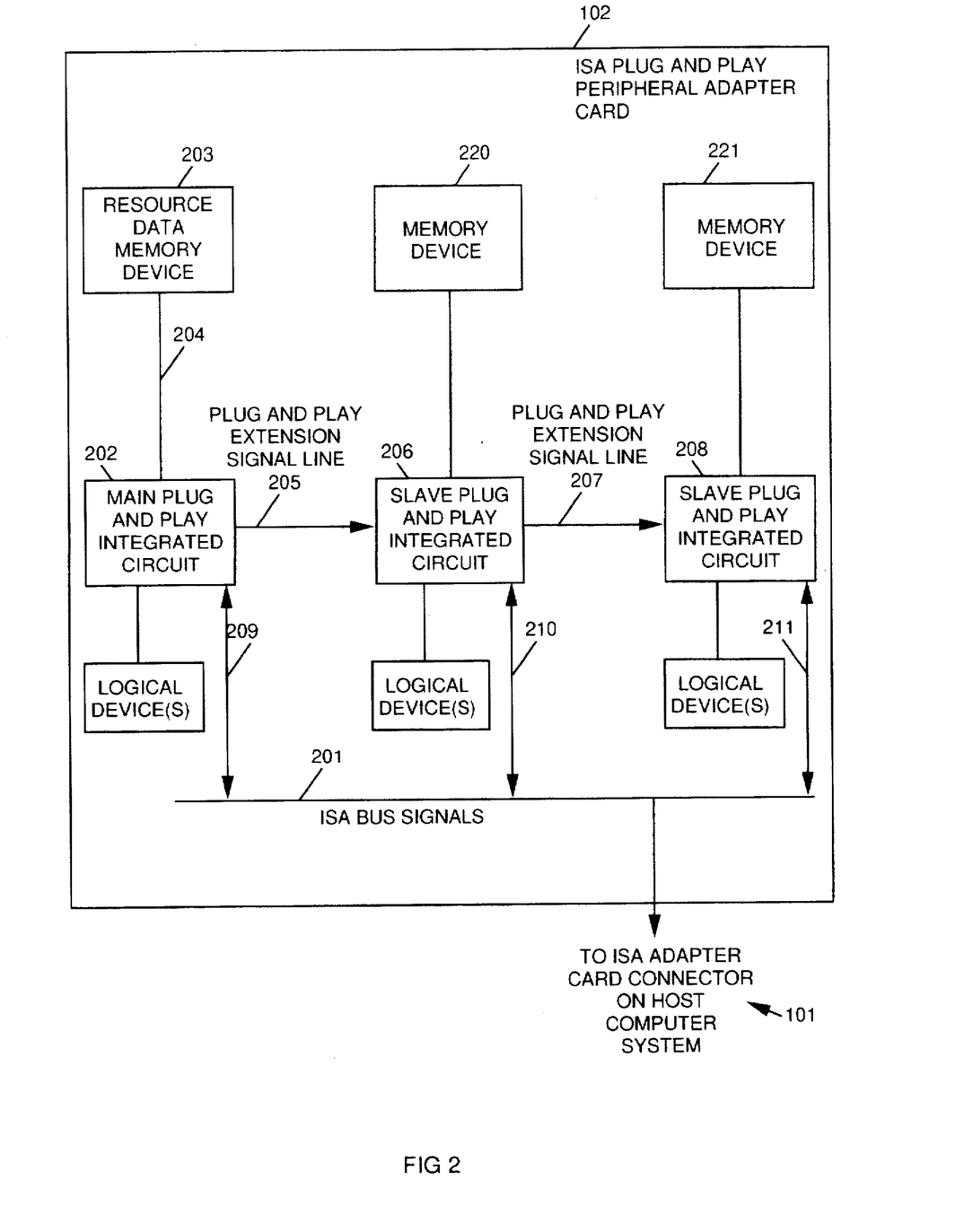
FIG. 2 illustrates an ISA Plug and Play peripheral adapter card configured in accordance with the present invention.

Referring next to FIG. 2, there is illustrated ISA peripheral adapter card 102, containing at a minimum, "main Plug and Play integrated circuit" 202, which contains the logic circuits required to perform the protocol as described in the ISA Plug and Play Specification, and which contains the additions to the Plug and Play logic circuits which are the subject of this invention. Main integrated circuit 202 may also contain logic circuits pertaining to the specific function of adapter card 102. Main integrated circuit 202 also provides a method for accessing resource data stored on adapter card 102, typically via an interface to a serial EEPROM device 203, as described in the ISA Plug and Play Specification.

One or more "slave Plug and Play integrated circuits" 206 and 208 may also be present on card 102, or provision may be made for their installation after card 102 is manufactured. Slave integrated circuits 206 and 208 may also contain logic circuits pertaining to specific functions on adapter card 102. Design and construction of main Plug and Play integrated circuit 202 and slave Plug and Play integrated circuits 206 and 208, other than the specific features described in this invention, are a matter of common practice to an experienced practitioner in the art.

Main integrated circuit 202 and slave integrated circuits 206 and 208 are coupled to ISA bus 201 via connections 209–211, respectively. ISA bus 201 is coupled to ISA bus 112 via connector 101.

Main Plug and Play integrated circuit 202 participates fully in the ISA Plug and Play protocol as defined in the Specification. Main Plug and Play integrated circuit 202 also provides, or provides an interface to, resource description data for all Plug and Play logical devices on card 102, irrespective of whether these devices are configured in main integrated circuit 202 or in slave integrated circuits 206 and 208. That is, the resource data for the entire adapter card 102 (typically contained in a programmable EEPROM memory device), is accessed through circuits on main integrated circuit 202, and contains resource data descriptions for all logical devices carried by adapter card 102, whether the configuration registers and functional logic for those devices are within main integrated circuit 202 or one of slave integrated circuits 206 or 208.

Additionally, main Plug and Play integrated circuit 202 maintains in its logic circuits or otherwise a "maximum logical device count" indicating the final (highest logical device number) device present or configured by main Plug and Play integrated circuit 202. One method for setting this logical device count is for the count to be stored in a locally accessible area of resource data memory device 203 coupled to integrated circuit 202 by connection 204. This method allows change in the count value on adapter card 102 by reprogramming resource data memory device 203 rather than the more expensive and difficult method of modifying logic circuits in integrated circuit 202.

Main Plug and Play integrated circuit 202 also will set Plug and Play extension signal line 205, which is an external output from integrated circuit 202, to an active state if the ISA Plug and Play protocol activity causes addressing of a logical device number greater than the maximum logical device count associated with integrated circuit 202 and the ISA Plug and Play logic is in a Configuration state.

One implementation of the Plug and Play extension signal line is a single digital output pin from integrated circuit 202 which can be connected to a Plug and Play extension input pin on "downstream" slave integrated circuit 206. The output pin may indicate active state by either a high voltage or low voltage condition, depending on the signalling convention chosen.

Each slave Plug and Play integrated circuit 206 and 208 maintains in logic or otherwise a "maximum logical device count" indicating the final (highest logical device number) device present on the component, in the same manner as described above with respect to main Plug and Play integrated circuit 202. The "maximum logical device count" for slave integrated circuits 206 and 208 may be either hard wired within the integrated circuits 206 and 208, or presented to integrated circuits 206 and 208 via memory devices 220 and 221, respectively, or by programming via wiring input pins on each of integrated circuits 206 and 208. Slave Plug and Play integrated circuit 206, and successive slave integrated circuit(s) 208, have a logical device count higher than the main or proceeding slave integrated circuit.

Each slave Plug and Play integrated circuit 206 and 208 supports logic circuits for control and storage of the Plug and Play configuration register address, logical device number, read address, specific configuration registers for logical devices within this component, I/O range check logic (as appropriate) for those devices as described in the Plug and Play Specification.

Each slave Plug and Play integrated circuit 206 and 208 monitors ISA bus 201 at all times and receives and acts upon any Plug and Play commands that:

set the ISA Plug and Play read address;

set the ISA Plug and Play configuration register address;

set the ISA Plug and Play current logical device.

When the Plug and Play extension input pin into either integrated circuit 206 or integrated circuit 208 receives an active signal input, and the current logical device number being accessed by the host software is less than or equal to the maximum logical device number for this integrated circuit, the integrated circuit will respond to read and writes of configuration registers.

Slave Plug and Play integrated circuit 206 will set Plug and Play extension signal line 207, which is an external output from integrated circuit 206, to an active state if the ISA Plug and Play protocol activity causes addressing of a logical device number greater than the maximum logical device count within integrated circuit 206, and the Plug and Play extension input pin on integrated circuit 206 is receiving an active signal.

Figure 3:
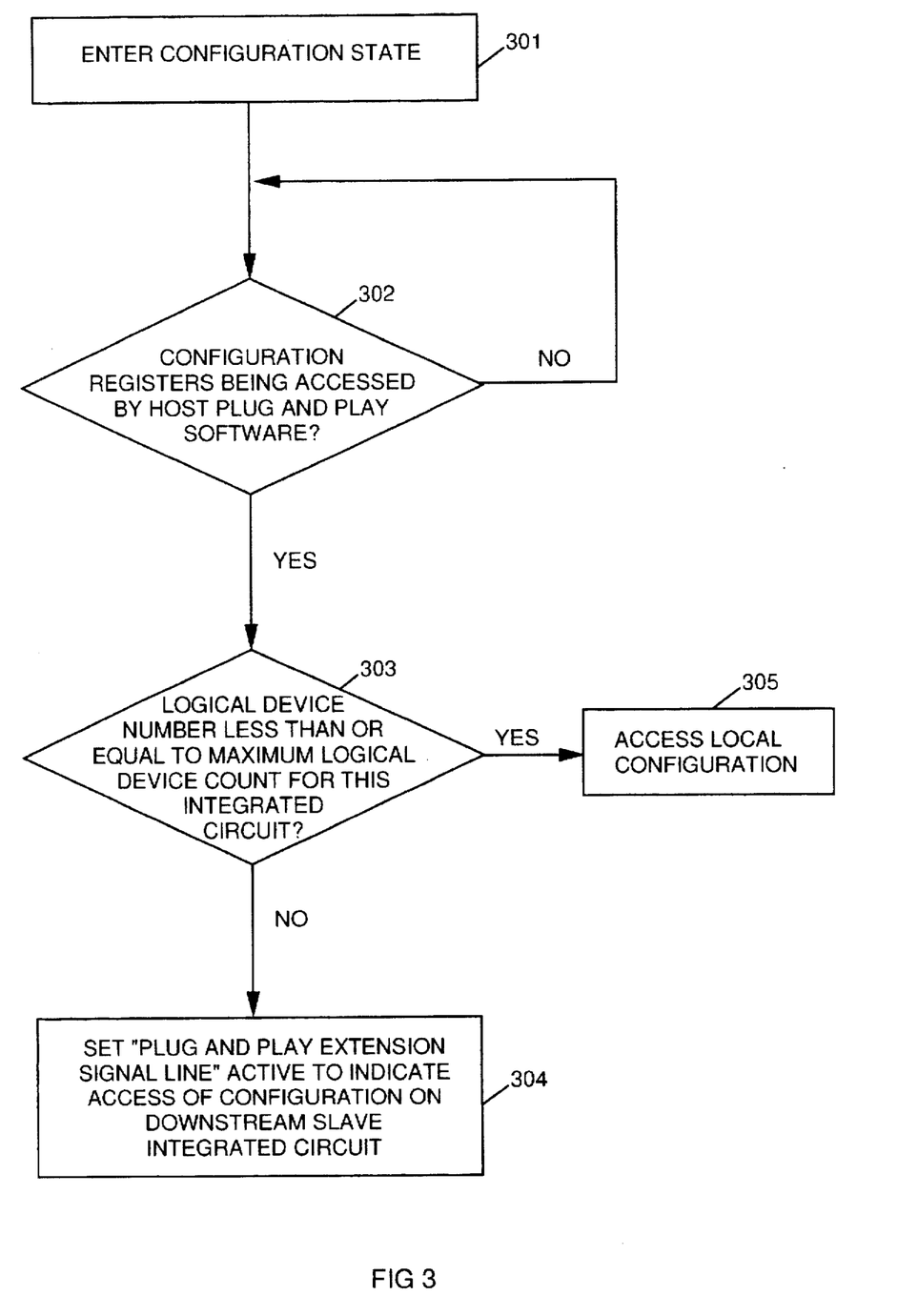
FIG. 3 illustrates, in flow diagram form, the decision flow for internal configuration and "downstream" signalling of slave integrated circuits in accordance with the present invention.

Referring next to FIG. 3, there is illustrated a flow diagram of an embodiment of the present invention within logic circuitry in main Plug and Play integrated circuit 202. As described above, when the Plug and Play protocol enters the configuration state 301, logic circuitry within main Plug and Play integrated circuit 202 proceeds to step 302 to determine whether or not the configuration registers within main Plug and Play integrated circuit 202 are being accessed by host Plug and Play software. If not, the process merely loops around until the configuration registers are being accessed by the host Plug and Play software. The process then proceeds to step 303 where a determination is made whether or not the logical device number indicated by the host Plug and Play software is less than or equal to the maximum logical device count indicated for integrated circuit 202. If yes, then the process proceeds to step 305 where the local configuration for the accessed logical device within integrated circuit 202 is accessed. If not, the process proceeds to step 304 where Plug and Play extension signal line 205 is set active to indicate access by the host Plug and Play software of configuration registers on a downstream slave integrated circuit, such as integrated circuits 206 or 208.

In other words, as the host Plug and Play software within the computer system begins to sequentially perform read/write operations to the configuration registers associated with each of the logical devices on adapter card 102, each of integrated circuits 202, 206, and 208 monitor this process via buses 209, 210, and 211, respectively, to determine whether or not an associated logical device is the logical device presently being accessed.

Plug and Play extension signal line 205 will go active if the host Plug and Play software is attempting to access the configuration registers associated with the logical device not associated with integrated circuit 202.

Figure 4:
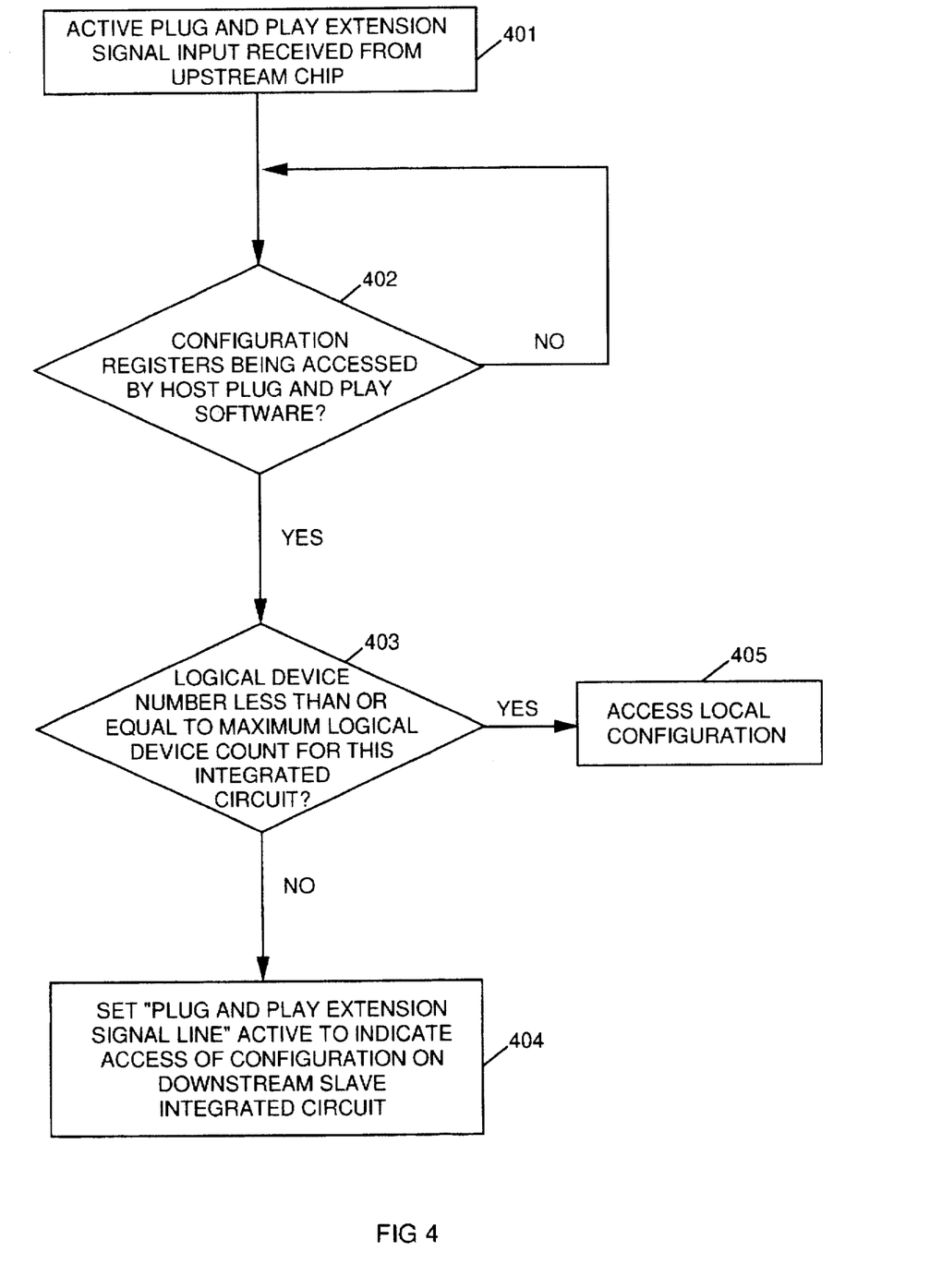
FIG. 4 illustrates, in flow diagram form, a decision flow for internal configuration for "downstream" signalling of the next slave integrated circuit in accordance with the present invention.

Referring next to FIG. 4, there is illustrated a flow diagram of an embodiment of the present invention implemented within slave Plug and Play integrated circuits 206 and 208. The following description will be with respect to integrated 206, but may also be applicable to integrated circuit 208.

When slave Plug and Play integrated circuit 206 senses an active Plug and Play extension signal input received from integrated circuit 202 (step 401) the process internal to the logic circuitry within integrated circuit 206 proceeds to step 402 to determine whether or not any configuration registers are being accessed by the host Plug and Play software. If yes, the process proceeds to step 403 to determine whether or not the logical device number presently being accessed by the host Plug and Play software is less than or equal to the maximum logical device count associated with integrated circuit 206. If yes, then configuration registers associated with integrated circuit 206 are accessed in step 405. If not, the process proceeds to step 404 to set Plug and Play extension signal line 207 to an active state to indicate that an access of configuration registers on integrated circuit 208 is being performed by the host Plug and Play software.

The present invention allows multiple integrated circuits to support Plug and Play logical devices under one Plug and Play card (one unique card select number (CSN)). Additionally, the present invention avoids the duplication of resource data interface, initiation key, and serial isolation logic circuits across multiple integrated circuits on a single ISA Plug and Play peripheral adapter card. The present invention allows the logic circuits associated with the resource data interface, initiation key, and serial isolation to be present only in main integrated circuit 202. These circuits do not need to be replicated in slave circuits 206 and 208, which need only contain logic to support configuration registers.

Although the present invention and its advantages have been described in detail, it should be understood that various changes, substitutions and alterations can be made herein without departing from the spirit and scope of the invention as defined by the appended claims.

What is claimed is:

1. An ISA Plug and Play adapter card comprising:
    a first integrated circuit having one or more logical devices associated therewith;
    circuitry operable for coupling the first integrated circuit to an ISA bus;
    a second integrated circuit operably coupled to the ISA bus and having one or more logical devices associated therewith; and,
    circuitry for extending Plug and Play configuration to the second integrated circuit when Plug and Play configuration is addressing a logical device having a logical device number that is greater than a maximum logical device number associated with the first integrated circuit.

2. The adapter card as recited in claim 1, wherein the signalling circuitry includes a line coupled between pins on the first and second integrated circuits.

3. The adapter card as recited in claim 1, wherein the signalling circuitry signals the second integrated circuit to be ready to accept Plug and Play configuration signals when configuration registers on the adapter card are being accessed by a host Plug and Play software that is also in a configuration state.

4. The adapter card as recited in claim 1 further comprising:
    a third integrated circuit coupled to the ISA bus, and having one or more logical devices associated therewith;
    wherein the circuitry adaptable for extending Plug and Play configuration further comprises circuitry operable for signalling the third integrated circuit to be ready to accept Plug and Play configuration signals when the plug and play configuration is addressing a logical device having a logical device number greater than the logical device numbers associated with the first and second integrated circuits.

5. The adapter card as recited in claim 4, wherein the signalling circuitry includes a line coupled between pins on the second and third integrated circuits.

6. A method for extending Plug and Play ISA configuration from a first integrated circuit to a second integrated circuit on a Plug and Play ISA adapter card, the method comprising the steps of:
    at the first integrated circuit receiving and examining Plug and Play configuration signals;
    determining if the Plug and Play configuration signals are addressing a logical device having a logical device number greater than the maximum logical device number associated with the first integrated circuit; and
    sending a Plug and Play extension signal from the first integrated circuit to the second integrated circuit if the logical device number is greater than the maximum logical device number associated with the first integrated circuit.

7. The method as recited in claim 6, further comprising the steps of:
    sending a Plug and Play extension signal from the second integrated circuit to a third integrated circuit if the addressed logical device number is greater than the maximum logical device number associated with the second integrated circuit.

8. A data processing system comprising:
    a processor;
    a storage device;
    an input/output device;
    an adapter card connector;
    an ISA bus coupling the processor, the storage device, the input/output device, and the adapter card connector together;
    an adapter card coupled to the adapter card connector, wherein the adapter card further comprises:
        a plurality of integrated circuits each having one or more logical devices associated therewith said logical devices each having a unique number;
        circuitry for coupling the plurality of integrated circuits to the ISA bus; and
        circuitry responsive to Plug and Play configuration signals for extending Plug and Play configuration to a second integrated circuit when Plug and Play configuration is addressing a logical device having a logical device number that is greater than the maximum logical device number associated with the first integrated circuit.

9. The system as recited in claim 8, wherein a third one of the plurality of integrated circuits is coupled to the ISA bus, wherein one or more logical devices are associated with the third one of the plurality of integrated circuits, wherein the circuitry adaptable for extending Plug and Play configuration further comprises circuitry operable for signalling the third one of the plurality of integrated circuits to be ready to accept Plug and Play configuration signals when the Plug and Play configuration is addressing a logical device having a logical device number that is greater than a maximum logical device number associated with the second one of the plurality of integrated circuits.

10. An ISA Plug and Play adapter card comprising:
    a first integrated circuit;
    at least one additional integrated circuit;
    circuitry operable for coupling the first and the at least one additional integrated circuits to an ISA bus;
    each of said integrated circuits including a plurality of logical devices having a unique set of addressing indicia associated therewith;
    said first integrated circuit including circuitry operable for signalling a predetermined at least one additional integrated circuit to be ready to accept Plug and Play configuration signals when the plug and play configuration is addressing a logical device having addressing indicia not included in the set located in the first integrated circuit; and said at least one other integrated circuit including circuitry operable for signalling a different predetermined at least one other integrated circuit to be ready to accept Plug and Play configuration signals when the plug and play configuration is addressing a logical device having addressing indicia not included in the set located in the said at least one other integrated circuit.

11. An ISA Plug and Play adapter card as set forth in claim 10 in which the set of addressing indicia associated with the logical devices located in the first adapter include a plurality of unique numbers and the set of addressing indicia associated with the at least one additional integrated circuits each include a plurality of unique numbers.

* * * * *